(12) United States Patent
Jeon et al.

(10) Patent No.: US 10,890,793 B2
(45) Date of Patent: Jan. 12, 2021

(54) LIQUID CRYSTAL FILM CELL AND USE THEREOF

(71) Applicant: LG Chem, Ltd., Seoul (KR)

(72) Inventors: Byoung Kun Jeon, Daejeon (KR); Su Young Ryu, Daejeon (KR); Moon Soo Park, Daejeon (KR); Seong Min Lee, Daejeon (KR); Ji Hoon Park, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/089,902

(22) PCT Filed: Nov. 27, 2017

(86) PCT No.: PCT/KR2017/013578
§ 371 (c)(1),
(2) Date: Sep. 28, 2018

(87) PCT Pub. No.: WO2018/097673
PCT Pub. Date: May 31, 2018

(65) Prior Publication Data
US 2019/0107742 A1    Apr. 11, 2019

(30) Foreign Application Priority Data

Nov. 25, 2016  (KR) .................. 10-2016-0158401
Nov. 24, 2017  (KR) .................. 10-2017-0158252

(51) Int. Cl.
*G02F 1/1333* (2006.01)
*G02B 6/32* (2006.01)
(Continued)

(52) U.S. Cl.
CPC .............. *G02F 1/1333* (2013.01); *B60J 3/04* (2013.01); *E06B 9/24* (2013.01); *G02B 5/3016* (2013.01);
(Continued)

(58) Field of Classification Search
CPC ............. G02F 1/1333; G02F 1/133305; G02F 1/1339; G02F 1/1337; G02F 2201/54;
(Continued)

(56) References Cited

U.S. PATENT DOCUMENTS 4,526,818 A    7/1985  Hoshikawa et al.
6,570,707 B1   5/2003  Murakami et al.
(Continued)

FOREIGN PATENT DOCUMENTS

JP    56167125 A * 12/1981 ......... G02F 1/13392
JP    S56167125 A   12/1981
(Continued)

OTHER PUBLICATIONS

Extended European Search Report including the Written Opinion for Application No. EP 17874047.8 dated May 6, 2019.
(Continued)

*Primary Examiner* — Nathanael R Briggs
(74) *Attorney, Agent, or Firm* — Lerner, David, Littenberg, Krumholz & Mentlik, LLP

(57) ABSTRACT

The liquid crystal film cell of the present application can control expansion of a base film at a high temperature by applying an expansion control layer having a high-temperature expansion coefficient different from that of the base film thereto, thereby effectively maintaining a cell gap at a high temperature, whereby high-temperature durability can be improved and gravity defects can be eliminated.

16 Claims, 4 Drawing Sheets

(51) Int. Cl.
*G02B 5/30* (2006.01)
*B60J 3/04* (2006.01)
*E06B 9/24* (2006.01)
*G02F 1/1339* (2006.01)
*G02B 5/22* (2006.01)
*G02F 1/1337* (2006.01)

(52) U.S. Cl.
CPC ............. *G02B 6/32* (2013.01); *G02F 1/1339* (2013.01); *G02F 1/133305* (2013.01); *E06B 2009/2464* (2013.01); *G02B 5/223* (2013.01); *G02F 1/1337* (2013.01); *G02F 1/13392* (2013.01); *G02F 2201/54* (2013.01)

(58) Field of Classification Search
CPC ...... B60J 3/04; E06B 9/24; E06B 2009/2464; G02B 5/223; G02B 5/3016; G02B 6/32
See application file for complete search history.

(56) References Cited

U.S. PATENT DOCUMENTS

| | | | |
|---|---|---|---|
| 2004/0239850 A1 | 12/2004 | Kim | |
| 2008/0284972 A1 | 11/2008 | Kim et al. | |
| 2009/0147211 A1* | 6/2009 | Niiyama | G02F 1/13718 |
| | | | 349/186 |
| 2010/0026938 A1* | 2/2010 | Hattori | G02F 1/13345 |
| | | | 349/96 |
| 2011/0007259 A1 | 1/2011 | Okabe et al. | |
| 2013/0170033 A1* | 7/2013 | Park | G02B 5/3025 |
| | | | 359/483.01 |
| 2015/0325187 A1* | 11/2015 | Tanaka | G02F 1/13454 |
| | | | 345/209 |

FOREIGN PATENT DOCUMENTS

| | | |
|---|---|---|
| JP | 2002040401 A | 2/2002 |
| JP | 2002116433 A | 4/2002 |
| JP | 2004354995 A | 12/2004 |
| JP | 2007248983 A | 9/2007 |
| JP | 2008139368 A | 6/2008 |
| JP | 2009109602 A | 5/2009 |
| KR | 20040001112 A | 1/2004 |
| KR | 20080050720 A | 6/2008 |
| KR | 20080102072 A | 11/2008 |
| KR | 20130074987 A | 7/2013 |
| KR | 20130078606 A | 7/2013 |
| KR | 101401117 B1 | 5/2014 |

OTHER PUBLICATIONS

Search report from International Application No. PCT/KR2017/013578, dated Feb. 13, 2018.

* cited by examiner

[Figure 1]
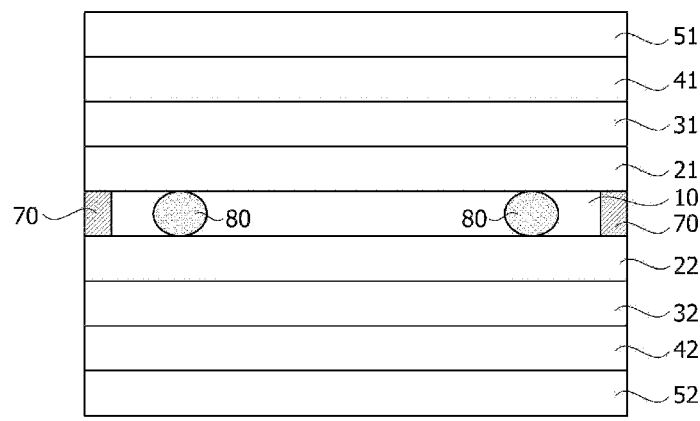
[Figure 2]
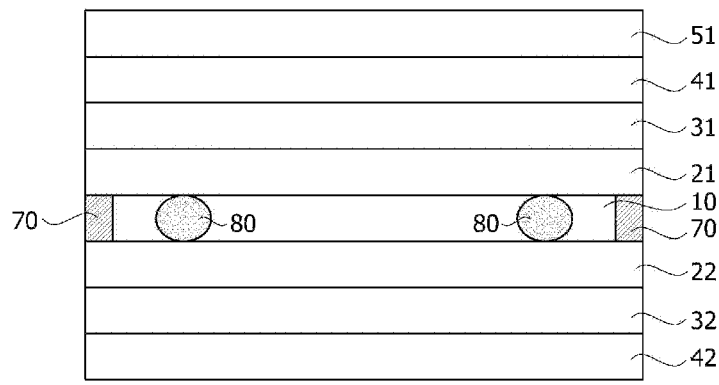
[Figure 3]
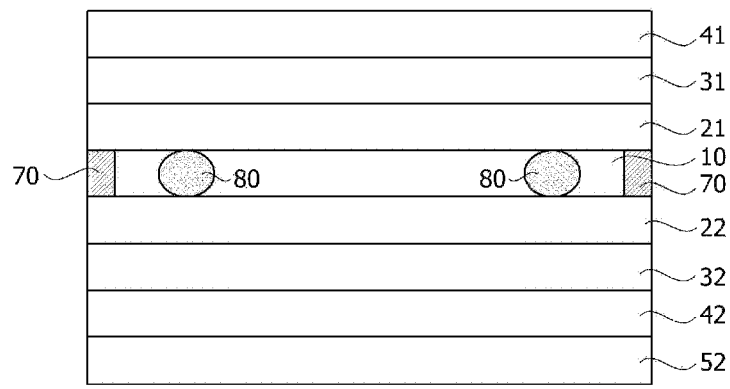

[Figure 4]
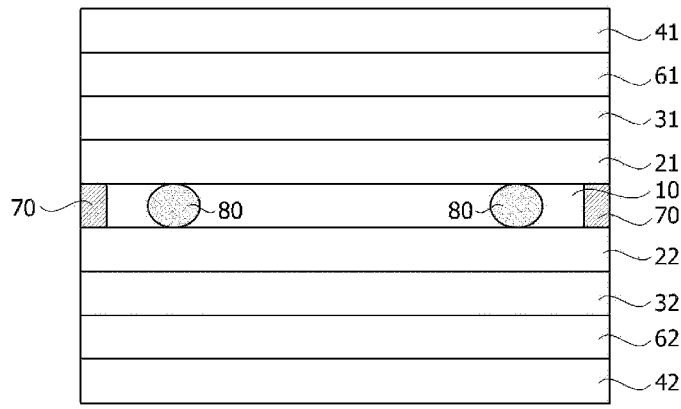
[Figure 5]
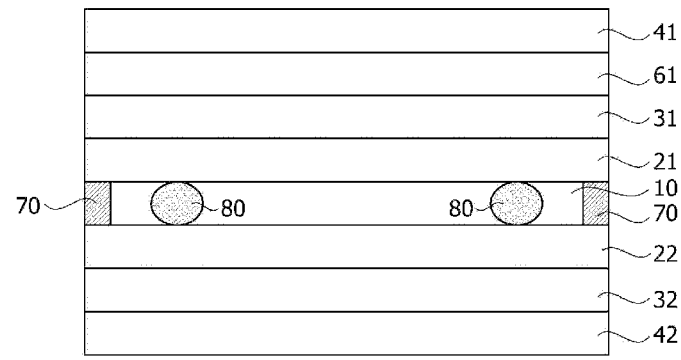
[Figure 6]
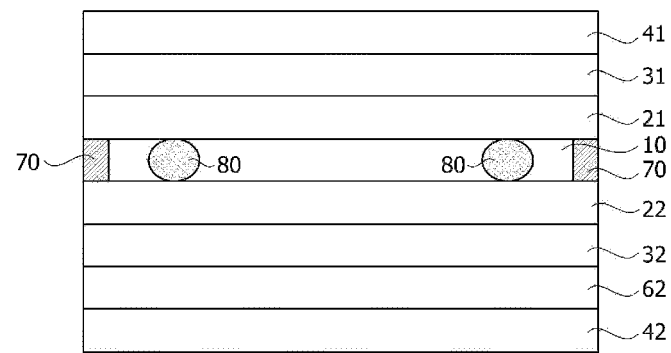

[Figure 7]
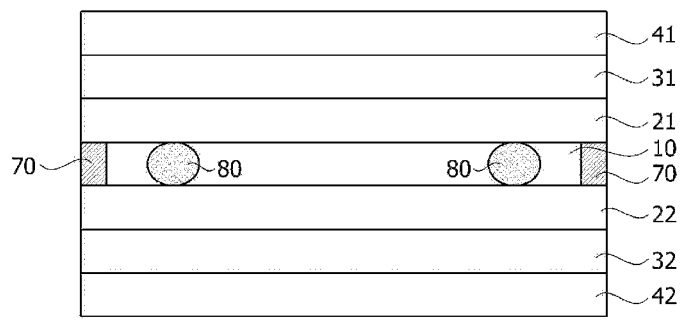
[Figure 8]
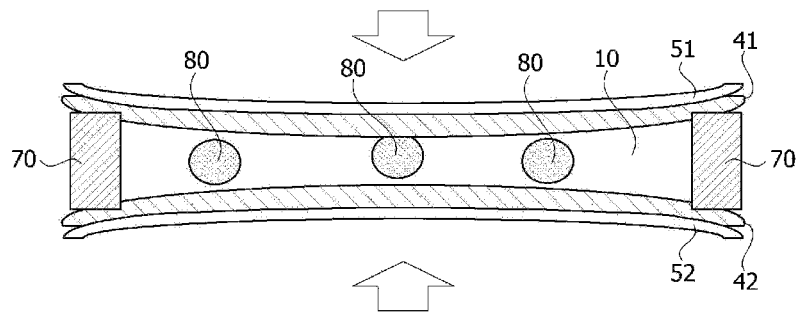
[Figure 9]
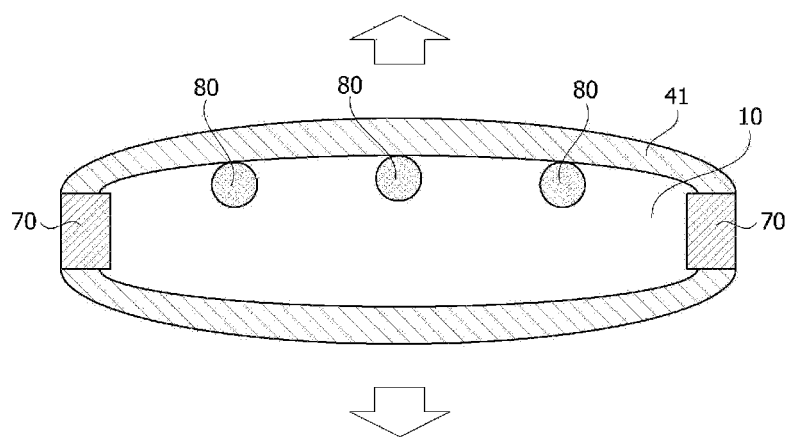

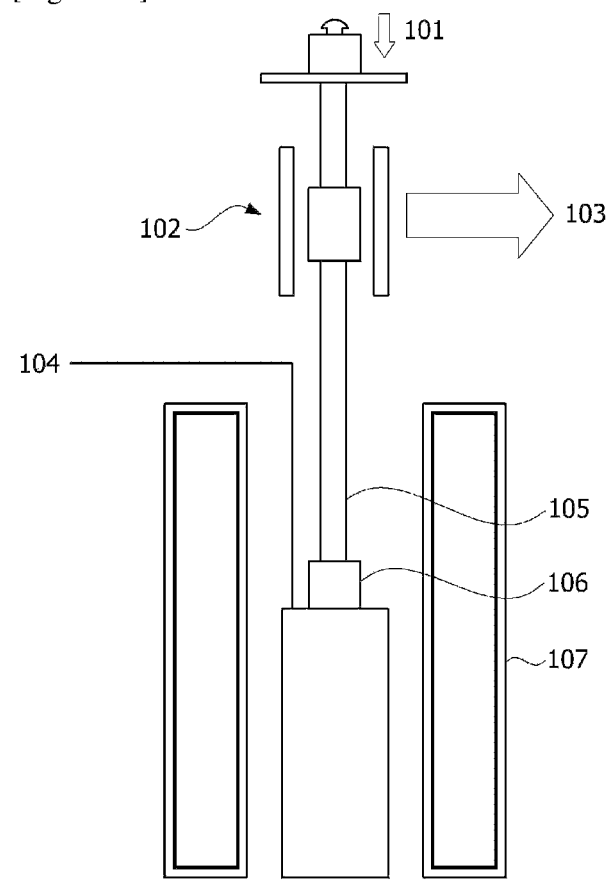
[Figure 10]

LIQUID CRYSTAL FILM CELL AND USE THEREOF

CROSS-REFERENCE TO RELATED APPLICATIONS present application is a national phase entry under 35 U.S.C. § 371 of International Application No. PCT/KR2017/013578, filed on Nov. 27, 2017, which claims priority to Korean Patent Application No. 10-2016-0158401, filed on Nov. 25, 2016 and Korean Patent Application No. 10-2017-0158252, filed on Nov. 24, 2017, the disclosures of which are incorporated herein by reference.

TECHNICAL FIELD

The present application relates to a liquid crystal film cell and a use thereof.

BACKGROUND ART

The liquid crystal film cell generally comprises an upper base film, a liquid crystal layer and a lower base film sequentially (Korean Laid-Open Patent Publication No. 10-2008-0102072). However, the conventional liquid crystal film cell causes a problem due to the expansion of the base film at a high temperature. A first problem is that air bubbles are generated due to a difference between an expansion of the base film and an expansion of the liquid crystal layer at a high temperature. A second problem is that a cell gap of the liquid crystal film cell cannot be maintained due to the expansion of the base film at a high temperature. When the base film is exposed to the outside, such as an automobile window, for example, a rear glass or a side glass, or an automobile sunroof, liquid crystals and dyes are laminated toward the bottom of the liquid crystal film cell by gravity at the time of not maintaining the cell gap, so that a defect causes, in which the upper part increases transmittance and the lower part decreases transmittance. Such a problem is more likely to occur as the size of the liquid crystal film cell becomes larger, and it is a problem that must be solved in order to commercialize the liquid crystal film cell.

DISCLOSURE

Technical Problem

It is a problem of the present invention to provide a liquid crystal film cell in which the cell gap of the liquid crystal film cell is maintained at a high temperature by controlling the expansion of the base film at a high temperature, thereby improving high-temperature durability and eliminating gravity defects.

Technical Solution

The present application relates to a liquid crystal film cell capable of solving the above problem. The liquid crystal film cell may comprise a first base film, a liquid crystal layer and a second base film sequentially. The liquid crystal film cell may further comprise an expansion control layer. The expansion control layer may be disposed on one side of the first base film or the second base film. The expansion control layer may have an expansion coefficient at a temperature of 25° C. to 120° C. different from that of the first base film or the second base film.

The liquid crystal film cell of the present application can control the expansion of the first base film or the second base film at a high temperature by applying an expansion control layer having a high-temperature expansion coefficient different from that of the base film to the base film, thereby effectively maintaining the cell gap at a high temperature, whereby high-temperature durability can be improved and gravity defects can be eliminated. Hereinafter, the liquid crystal film cell of the present application will be described in detail.

The expansion control layer may be disposed on one side of the first base film or the second base film. In one example, the expansion control layer may be directly formed on one side of the first base film or the second base film.

In this specification, the fact that A is directly formed on B may mean that A and B are formed in contact with each other without any medium between A and B. The expansion control layer may be formed on one side of the first base film or the second base film and designed so that the film is deformed into the liquid crystal film cell, as the temperature rises, to maintain the cell gap. In particular, as the liquid crystal film cell is enlarged, the force of being deformed into the inside is increased, whereby the cell gap can be more stably maintained. When the cell gap is stably maintained at a high temperature, high-temperature durability and gravity defects can be solved.

The expansion control layer may have an expansion coefficient at a temperature of 25° C. to 120° C. different from that of the first base film or the second base film. In this specification, the fact that the expansion coefficient at a temperature of 25° C. to 120° C. differs may mean that the expansion coefficient differs over the entire temperature range of 25° C. to 120° C. or may mean that the expansion coefficient at a certain range or at a specific temperature of the temperature range of 25° C. to 120° C. differs. According to one example of the present application, the expansion control layer may have an expansion coefficient different from that of the first base film and the second base film at a temperature of 120° C. In this specification, the expansion coefficient at a temperature of 25° C. to 120° C. may mean a thermal expansion coefficient measured by a thermal expansion coefficient meter (TMA). The expansion coefficient at a temperature of 25° C. to 120° C. can be measured according to the method of <high-temperature expansion coefficient measurement> described in the detailed description of the present invention.

In this specification, the expansion coefficient may be an expansion coefficient based on a change in length of the base film or the expansion control layer. The expansion coefficient can be calculated by Equation 1 below.

$$E = \{L[120° C.] - L[25° C.]\}/L[25° C.] \times 100 \quad \text{[Equation 1]}$$

In Equation 1 above, E may be an expansion coefficient of the base film or the expansion control layer, L[25° C.] may be a length of the base film or the expansion control layer at 25° C., and L[120° C.] may mean a length after raising the temperature of the base film or the expansion control layer from 25° C. by 5° C. and leaving it at 120° C. for 10 hours. The length may mean a longitudinal or transverse length, and L[25° C.] and L[120° C.] mean lengths in the same direction, respectively. If the E value of the expansion control layer is a negative number, it can be called a shrinkable control film, and if the E value of the expansion control layer is a positive number, it can be called an expansible control film. The base film used for measurement of the expansion coefficient may have an area of 10 mm×5 mm and a thickness of 100 μm, and the expansion control layer may have an area of 10 mm×5 mm and a thickness of 1 μm.

The expansion control layer may have a difference in expansion coefficient at a temperature of 25° C. to 120° C. of −30% to 30% with the first base film or the second base film. Accordingly, the expansion control layer may be designed so that the base film is deformed into the liquid crystal film cell as the temperature rises, thereby effectively maintaining the cell gap.

The ratio of the expansion coefficient at a temperature of 25° C. to 120° C. of the expansion control layer to the first base film or the second base film may be 1:0.7 to 1:1.3. Accordingly, the expansion control layer may be designed so that the base film is deformed into the liquid crystal film cell as the temperature rises, thereby effectively maintaining the cell gap.

The expansion control layer may be disposed on the outer surface of the first base film or the second base film, or may be disposed on the inner surface. In this specification, the outer surface of the first or second base film may mean the opposite surface to the surface in the direction where the liquid crystal layer is disposed. In this specification, the inner surface of the first or second base film may mean the surface in the direction where the liquid crystal layer is disposed.

The relationship of high-temperature expansion coefficient between the expansion control layer and the first base film or the second base film can be adjusted depending on whether the expansion control layer is disposed on the outer surface or the inner surface of the first base film or the second base film.

In one example, the expansion control layer may be disposed on the outer surface of the first base film or the second base film. In this case, the expansion control layer may be a shrinkable control film having a lower expansion coefficient at a temperature of 25° C. to 120° C. as compared with the first base film or the second base film. In this case, the ratio of the expansion coefficient at a temperature of 25° C. to 120° C. of the shrinkable control film to the first base film or the second base film may be 1:0.999 to 1:0.7. In one example, the absolute value of the difference in expansion coefficient of the expansible control film with the first base film or the second base film may be 0.1% to 30%, and specifically, may be 1% or more, 2% or more, 3% or more, 4% or more, 5% or more, 6% or more, 7% or more, 8% or more, 9% or more, or 10% or more, and 30% or less, 25% or less, 20% or less, 15% or less, 13% or less, or 11% or less. Accordingly, the expansion control layer may be designed so that the base film is deformed into the liquid crystal film cell, thereby effectively maintaining the cell gap.

In another example, the expansion control layer may be disposed on the inner surface of the first base film or the second base film. In this case, the expansion control layer may be an expansible control film having a greater expansion coefficient at a temperature of 25° C. to 120° C. as compared with the first base film or the second base film. In this case, the ratio of the expansion coefficient at a temperature of 25° C. to 120° C. of the expansible control film to the first base film or the second base film may be 1:1.001 to 1:1.3. In one example, the absolute value of the difference in expansion coefficient of the expansible control film with the first base film or the second base film may be 0.1% to 30%, and specifically, may be 1% or more, 2% or more, 3% or more, 4% or more, 5% or more, 6% or more, 7% or more, 8% or more, or 9% or more, and 30% or less, 25% or less, 20% or less, 15% or less, 13% or less, 11% or less, or 10% or less. Accordingly, the expansion control layer may be designed so that the base film is deformed into the liquid crystal film cell, thereby effectively maintaining the cell gap.

In one example, the expansion control layer may be disposed on one side of each of the first base film and the second base film. In another example, the expansion control layer may be disposed on one side of any one base film of the first base film and the second base film.

According to a first example of the present application, the liquid crystal film cell comprises a first base film, a liquid crystal layer and a second base film sequentially, wherein the outer surface of the first base film and the outer surface of the second base film may comprise a first shrinkable control film and a second shrinkable control film, respectively.

According to a second example of the present application, the liquid crystal film cell comprises a first base film, a liquid crystal layer and a second base film sequentially, wherein the outer surface of the first base film may comprise a first shrinkable control film.

According to a third example of the present application, the liquid crystal film cell comprises a first base film, a liquid crystal layer and a second base film sequentially, wherein the outer surface of the second base film may comprise a second shrinkable control film.

According to a fourth example of the present application, the liquid crystal film cell comprises a first base film, a liquid crystal layer and a second base film sequentially, wherein the inner face of the first base film and the inner face of the second base film may comprise a first expansible control film and a second expansible control film, respectively.

According to a fifth example of the present application, the liquid crystal film cell comprises a first base film, a liquid crystal layer and a second base film sequentially, wherein the inner surface of the first base film may comprise a first expansible control film.

According to a sixth example of the present application, the liquid crystal film cell comprise a first base film, a liquid crystal layer and a second base film sequentially, wherein the inner surface of the second base film may comprise a second expansible control film.

As the first base film and/or the second base film, an inorganic film such as a glass base material, a crystalline or amorphous silicon film, quartz or an ITO (indium tin oxide) film or a plastic film, and the like can be used. As the first base film or the second base film, an optically isotropic base material or an optically anisotropic base material such as a retardation layer can be used.

According to one example of the present application, a plastic film can be used as the first base film and/or the second base film. The plastic film may comprise a polymer. A specific example of the plastic film can be exemplified by a base film comprising TAC (triacetyl cellulose); COP (cycloolefin copolymer) such as a norbornene derivative; PMMA (poly(methyl methacrylate); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketon); PPS (polyphenylsulfone); PEI (polyetherimide); PEN (polyethylenemaphthatlate); PET (polyethyleneterephtalate); PI (polyimide); PSF (polysulfone); PAR (polyarylate) or an amorphous fluororesin, and the like, but is not limited thereto. A coating layer of gold, silver, or a silicon compound such as silicon dioxide or silicon monoxide, or a coating layer such as an antireflection layer may also be present on the base material.

The expansion coefficient of the first base film and/or the second base film may be appropriately selected in consideration of the object of the present application. In one example, the expansion coefficient of the first base film and/or the second base film at 120° C. may be −30% to 30%, −20% to 20%, −10% to 10%, −5% to 5%, −3% to 3%, −1% to 1%, or −0.5% to 0.5%. In this case, it may be advantageous in terms of structural stabilization of the liquid crystal film cell. The expansion coefficients of the first base film and the second base film may be the same or different from each other.

The thicknesses of the first base film and/or the second base film may be suitably selected in consideration of the object of the present application. In one example, the thickness of the first base film and/or the second base film may be 50 μm to 300 μm, 60 μm to 250 μm, 70 μm to 200 μm, 80 μm to 150 μm or 90 μm to 110 μm. When the thickness of the first base film and/or the second base film is in the above range, it is advantageous in terms of structural stabilization of the liquid crystal film cell.

The expansion coefficient of the expansion control layer can be appropriately selected in consideration of the object of the present application. In one example, when the expansion control layer is disposed on the outer surface of the first base film or the second base film, the expansion coefficient at a temperature of 25° C. to 120° C. may be −30% or more to less than 30%. Specifically, the expansion coefficient may be −30% or more, −25% or more, −20% or more, −15% or more, −13% or more, or −11% or more, and may be less than 30%, 25% or less, 20% or less, 10% or less, 5% or less, 0% or less, −5% or less, −7% or less, or −9% or less.

In another example, when the expansion control layer is disposed on the inner surface of the first base film or the second base film, the expansion coefficient at a temperature of 25° C. to 120° C. may be more than −30% to 30% or less. Specifically, the expansion coefficient may be more than −30%, −25% or more, −20% or more, −15% or more, −10% or more, −5% or more, 0% or more, 5% or more, 7% or more, or 9% or more, and may be 30% or less, 25% or less, 20% or less, 15% or less, 13% or less, or 11% or less. In this case, it may be advantageous in terms of structural stabilization of the liquid crystal film cell.

The thickness of the expansion control layer can be appropriately selected in consideration of the object of the present application. In one example, the thickness of the expansion control layer may be 0.5 μm to 300 μm. The thickness may be 0.5 μm or more, or 1 μm or more, and may be 100 μm or less, 80 μm or less, 60 μm or less, 40 μm or less, 20 μm or less, 10 μm or less, 5 μm or less, or 3 μm or less. When the thickness of the expansion control layer is in the above range, it is advantageous in terms of structural stabilization of the liquid crystal film cell.

The expansion control layer may comprise a polymer. For example, the expansion control layer may comprise an epoxy polymer or an acrylic polymer. In one example, if the expansion control layer is a shrinkable control film, it may comprise an epoxy polymer. In another example, if the expansion control layer is an expansible control film, it may comprise an acrylic polymer.

The expansion control layer may be prepared by coating a composition comprising the epoxy polymer or acrylic polymer, an initiator and a solvent on a base material, drying it to remove the solvent, and then ultraviolet-curing the composition.

The high-temperature expansion coefficient of the expansion control layer can be controlled by methods known in the art. As one example, the expansion coefficient of the expansion control layer can be adjusted through controlling the composition of the polymer in the composition and the thickness of the expansion control layer. The expansion control layer may have a polymer content of 0.1 wt % to 50 wt %. The polymer content may mean the content of a polymer monomer, for example, an epoxy monomer or an acrylic monomer in a composition for forming an expansion control layer. Specifically, the content may be 0.1 wt % or more, 0.5 wt % or more, 1 wt % or more, 2 wt % or more, 3 wt % or more, or 4 wt % or more, and may be 50 wt % or less, 40 wt % or less, 30 wt % or less, 20 wt % or less, 10 wt % or less, 8 wt % or less, or 6 wt % or less. Here, the remaining weight %, other than the monomers, is composed of the solvent, in which the sum may be 100 wt %. As the solvent, a known organic solvent, for example, a toluene solvent may be used. As described above, the thickness of the expansion control layer can be appropriately adjusted within a range of 0.5 μm to 300 μm depending on the desired expansion coefficient.

The expansion control layer may not comprise an inorganic compound. The inorganic compound may be exemplified by a metal, or a non-metal such as boron and silicon, and may be exemplified by oxides, sulfides or nitrides of the metal or non-metal, and the like. The present application can be more advantageous in providing a liquid crystal film cell capable of maintaining a cell gap of the liquid crystal film cell at a high temperature to improve high-temperature durability and eliminate gravity defects by controlling expansion of a base film at a high temperature using an expansion control layer comprising a polymer.

The liquid crystal layer may comprise a liquid crystal compound and an anisotropic dye. The liquid crystal layer can convert its orientation according to external voltage application. The liquid crystal layer can convert alignment of the liquid crystals and the anisotropic dyes according to external voltage application. The liquid crystal layer can vary the transmittance according to external voltage application. The liquid crystal layer may exhibit anisotropic light absorption characteristics with respect to an alignment direction of the anisotropic dye and a direction perpendicular to the alignment direction. For example, the anisotropic dye is a substance whose absorptivity of light changes according to a polarization direction, where if the absorptivity of light polarized in the long axis direction is large, it may be called a p-type dye, and if the absorptivity of light polarized in the short axis direction is large, it may be called an n-type dye. In one example, when the p-type dye is used, the polarized light vibrating in the long axis direction of the dye may be absorbed and the polarized light vibrating in the short axis direction of the dye may be less absorbed and thus transmitted.

As the liquid crystal compound, a liquid crystal compound whose orientation direction can be changed by external voltage application can be used without any particular limitation. As the liquid crystal, for example, a smectic liquid crystal, a nematic liquid crystal or a cholesteric liquid crystal, and the like can be used. Furthermore, the liquid crystal may be, for example, a compound without any polymerizable group or cross-linkable group, so that the orientation direction may be changed by external voltage application.

The liquid crystal compound and the anisotropic dye may be present in the liquid crystal layer in a vertical orientation, horizontal orientation, oblique orientation spray orientation, hybrid orientation or twist orientation state.

In this specification, the vertical orientation state may mean a state where all directors of liquid crystal molecules are perpendicularly arranged to the plane of the liquid crystal layer, for example, an arrangement state of forming 90 degrees to 85 degrees, 90 degrees to 86 degrees, 90 degrees to 87 degrees, 90 degrees to 88 degrees, 90 degrees to 89 degrees, and preferably about 90 degrees.

In this specification, the horizontal orientation state may mean a state where all directors of liquid crystal molecules are arranged in parallel with the plane of the liquid crystal layer, for example, an arrangement state of forming 0 degrees to 5 degrees, 0 degrees to 4 degrees, 0 degrees to 3 degrees, 0 degrees to 2 degrees, 0 degrees to 1 degree, and preferably 0 degrees.

In this specification, the oblique orientation state may mean a state where all directors of liquid crystal molecules are arranged so as to have a certain inclination angle with respect to the plane of the liquid crystal layer.

In this specification, the spray orientation state may mean a state arranged so that tilt angles of liquid crystal molecules are gradually changed along the thickness direction of the liquid crystal layer.

In this specification, the hybrid orientation state may mean a state where tilt angles of liquid crystal molecules are gradually changed along the thickness direction of the liquid crystal layer, so that they are arranged perpendicularly to the plane of the liquid crystal layer on one side of the liquid crystal layer, but are arranged in parallel to the plane of the liquid crystal layer on the other side.

In this specification, the twist orientation state may mean an arrangement state of a type where all directors of liquid crystal molecules are parallel to the plane of the liquid crystal layer, but angles of directors in neighboring liquid crystal molecules are slightly changed in the thickness direction of the liquid crystal layer, turned and twisted along the spiral axis. In one example, in the twist orientation state, the director of the topmost liquid crystal molecule along the thickness direction of the liquid crystal layer may be twisted about 90 degrees or about 180 degrees to about 270 degrees with respect to the director of the bottommost liquid crystal molecule.

In this specification, the term "optical axis" may mean a slow axis, where if the liquid crystal has a rod shape, it may mean an axis in the long axis direction of the liquid crystal, and if the liquid crystal has a discotic shape, it may mean an axis in the normal direction of the plane.

The liquid crystal may be present in the liquid crystal layer so that the orientation is switchable. In this specification, the phrase "the orientation is switchable" means that the alignment direction of the liquid crystal can be changed by external signal application such as voltage application.

The orientation state of the liquid crystal compound and the anisotropic dye can switch between at least two or more orientation states of the orientation states. According to one example of the present application, the liquid crystal compound and the anisotropic dye can be switched between the vertical orientation state and the horizontal orientation state. For example, the liquid crystal layer can implement either the vertical orientation state or the horizontal orientation state in the initial state and can be switched to the other state by external action such as voltage application. Here, when the external action is removed, the liquid crystal layer can be switched to the orientation state of the initial state. In this specification, the term "initial state" may mean no application state of voltage, i.e., a state where there is no external action that may affect the orientation of the liquid crystal layer, such as an external voltage.

In this specification, the term "dye" may mean a material capable of intensively absorbing and/or modifying light within at least a certain range or the entire range in a visible light region, for example, a wavelength range of 400 nm to 700 nm, and the term "anisotropic dye" may mean a material capable of anisotropically absorbing light in at least a certain range or the entire range of the visible light region.

As the anisotropic dye, for example, known dyes noted to have properties that can be aligned according to the alignment state of the liquid crystal can be selected and used. As the anisotropic dye, for example, a black dye can be used. Such a dye is known, for example, as an azo dye or an anthraquinone dye, but is not limited thereto.

The anisotropic dye may have, for example, a dichroic ratio of 5 or more, 6 or more, or 7 or more. In this specification, the term "dichroic ratio" may mean, for example, in the case of a p-type dye, a value that absorption of polarized light parallel to the long axis direction of the dye is divided by absorption of polarized light parallel to the direction perpendicular to the long axis direction. The anisotropic dye may satisfy the dichroic ratio at least at some wavelengths or at any one wavelength within the wavelength range of the visible light region, for example, within the wavelength range of about 380 nm to 700 nm or about 400 nm to 700 nm. The upper limit of the dichroic ratio may be, for example, 20 or less, 18 or less, 16 or less, or 14 or less.

The ratio of the anisotropic dye in the liquid crystal layer can be appropriately selected according to the desired physical properties, for example, the desired transmittance or reflectance variable characteristics of the liquid crystal layer. The liquid crystal layer may comprise an anisotropic dye in an amount of 0.1 wt % to 5 wt %.

The liquid crystal layer may comprise one or more spacers to maintain a cell gap. The spacer may be present in the liquid crystal layer in a region where the liquid crystal compound and the anisotropic dye are not present. The spacer may be present in contact with a member that contacts both sides of the liquid crystal layer. The member that contacts both sides of the liquid crystal layer may be the first and second base films, or first and second alignment films to be described below, or first and second electrode layers to be described below.

The spacer may be a ball-shaped spacer or a column-shaped spacer. According to one example of the present invention, a ball-shaped spacer may be used as the spacer.

The spacer may comprise a curable resin. As the curable resin, an ultraviolet curable resin or a thermosetting resin, and the like can be used. The size of the spacer can be appropriately selected in consideration of the size of the desired cell gap.

The liquid crystal layer may further comprise a sealant on its sides. The sealant can serve to prevent liquid crystals from leaking from the liquid crystal layer, to maintain the cell gap at a constant interval and to firmly bond the cell. The sealant may exist adjacent to a member in contact with both sides of the liquid crystal layer. The member in contact with both sides of the liquid crystal layer may be first and second base films, first and second alignment films to be described below, or first and second electrode layers to be described below.

The sealant may comprise a curable resin. As the curable resin, an ultraviolet curable resin or a thermosetting resin can be used.

The liquid crystal film cell may further comprise a first alignment film and a second alignment film, disposed on both sides of the liquid crystal layer. The first alignment film may be disposed between the first base film and the liquid crystal layer. The second alignment film may be disposed between the second base film and the liquid crystal layer. Such an alignment film has orientation force capable of controlling the initial alignment state of the liquid crystal compound and the anisotropic dye in the liquid crystal layer. As the alignment film, a vertical alignment film or a horizontal alignment film can be used. As the alignment film, for example, a contact type alignment film such as a rubbing alignment film, or a known alignment film capable of comprising a photo-alignment film compound to exhibit orientation characteristics by a contactless method such as irradiation of linearly polarized light, can be used.

The liquid crystal film cell may further comprise a first electrode layer and a second electrode layer, disposed on both sides of the liquid crystal layer. The first electrode layer may be disposed between the first base film and the liquid crystal layer. When the liquid crystal film cell comprises the first alignment film, the first electrode layer may be disposed between the first alignment film and the liquid crystal layer. The second electrode layer may be disposed between the second base film and the liquid crystal layer. When the liquid crystal film cell comprises the second alignment film, the second electrode layer may be disposed between the second alignment film and the liquid crystal layer The present application relates to a use of the liquid crystal film cell. In one example, the present application relates to a window comprising the liquid crystal film cell. In another example, the present application relates to a sunroof comprising the liquid crystal film cell.

The window or sunroof may be a vehicle window or a vehicle sunroof. The vehicle window may include a rear glass, a side glass, and the like. The sunroof is a fixed or operating (bending or sliding) opening existing in the ceiling of the vehicle, where is collectively called a device capable of functioning to allow light or fresh air to flow into the interior of the vehicle. The method of forming the window or sunroof as above is not particularly limited, and a conventional method can be applied as long as the liquid crystal film cell is used.

Advantageous Effects

The liquid crystal film cell of the present application can control expansion of a base film at a high temperature by applying an expansion control layer having a high-temperature expansion coefficient different from that of the base film thereto, thereby effectively maintaining a cell gap at a high temperature, whereby high-temperature durability can be improved and gravity defects can be eliminated.

BRIEF DESCRIPTION OF DRAWINGS

FIG. 1 is a structure of the liquid crystal film cell of Example 1.

FIG. 2 is a structure of the liquid crystal film cell of Example 2.

FIG. 3 is a structure of the liquid crystal film cell of Example 3.

FIG. 4 is a structure of the liquid crystal film cell of Example 4.

FIG. 5 is a structure of the liquid crystal film cell of Example 5.

FIG. 6 is a structure of the liquid crystal film cell of Example 6.

FIG. 7 is a structure of the liquid crystal film cell of Comparative Example 1.

FIG. 8 shows deformation of the liquid crystal film cell of Example 1 at high temperature.

FIG. 9 shows deformation of the liquid crystal film cell of Comparative Example 1 at high temperature.

FIG. 10 is a detail view of a TMA apparatus.

MODE FOR INVENTION

Hereinafter, the above contents will be described in more detail via Examples and Comparative Examples, but the scope of the present application is not limited by the following contents.

<High-Temperature Expansion Coefficient Measurement>

For a base film and an expansion control layer, the high-temperature expansion coefficient was measured by a method of measuring a change in the thermal expansion coefficient of a sample to exhibit while changing a temperature of 5° C. under a condition of 25° C. to 120° C. by using a TMA (thermomechanical analysis) apparatus of a product name Q400 from TA instruments manufacturer. The change in the thermal expansion coefficient is based on the change in length of the sample, and the expansion coefficient in the item of Examples and Comparative Examples means an expansion coefficient measured after being left at 120° C. for 10 minutes.

Specifically, the thermal expansion coefficient is measured by a thermal expansion coefficient meter (TMA). The TMA is a measurement method that when a sample has been heated or cooled to a given temperature condition, deformation of the sample exhibiting under a given load is measured as a function of temperature and time. As shown in FIG. 10, the force of pressing the sample between the quartz stage and the probe, with little thermal deformation, is 0.05 N, which is adjustable. While controlling the temperature, the position change of the probe by the sample is measured by the electrical signal of the LVDT. In the case of a polymer sample, the change of the glass transition temperature or the thermal expansion coefficient when the melting phenomenon occurs is accompanied, and thus the transition temperature can be measured through the change of the slope.

Force application range: 0.001 N to 2N
Temperature range: −150 to 1000° C.
Resolution: 15 nm
Sensitivity: 20 nm or less Example 1

A liquid crystal film cell of Example 1 having the structure of FIG. 1 was manufactured according to the following manufacturing method.

As the first and second base films (41, 42), a plastic film having an expansion coefficient at a temperature of 120° C. of 0.1% and a thickness of 100 μm was used. The first and second base films are PC (polycarbonate) films produced using a casting method.

As the first and second shrinkable control films (51, 52) which are the first and second expansion control layers, an epoxy polymer film having an expansion coefficient at a temperature of 120° C. of −10% and a thickness of 1 μm was used. Specifically, the first and second expansion control layers were produced by coating a solution comprising 5 wt % of an epoxy monomer, 95 wt % of a toluene solvent and an appropriate amount of a photoinitiator (Igacure 907) on the base film using a bar coater #3, and then drying it in a drying oven at 100° C. for 2 minutes and passing it through UV light having UV-A and UV-B at an intensity of 1000 mJ and a speed of 3 m/min.

As the first and second alignment films (21, 22), an alignment film having a thickness of 3 μm was prepared by coating a composition comprising a photoinitiator (Igacure 907) and an olefin thereon, and then performing UV curing.

The first and second electrode layers (31, 32) were produced by depositing ITO (indium-tin-oxide) to a thickness of 20 μm.

The liquid crystal layer (10) was manufactured by comprising a liquid crystal from Merck Co., Ltd. and an anisotropic dye from Merck Co., Ltd. in a weight ratio of 100:2, using 10 μm spacers (80) to be a cell gap of 10 μm and applying a sealant (70) to its sides.

The liquid crystal film cell of Example 1 was manufactured by laminating the first and second base films, the first and second expansion control layers, the first and second alignment films, the first and second electrode layers and the liquid crystal layer according to the laminating sequence of FIG. 1 with an ODF (one-drop filling) method. The manufactured liquid crystal film cell has a width of 500 mm and a height of 1000 mm.

Example 2

A liquid crystal film cell having the structure of FIG. 2 was manufactured in the same manner as in Example 1, except that in Example 1, the second shrinkable control film was excluded and the first shrinkable control film (51) was disposed only on the outside of the first base film.

Example 3

A liquid crystal film cell having the structure of FIG. 3 was manufactured in the same manner as in Example 1, except that in Example 1, the first shrinkable control film was excluded and the second shrinkable control film (52) was disposed only on the outside of the second base film.

Example 4

A liquid crystal film cell having the structure of FIG. 4 was manufactured in the same manner as in Example 1, except that instead of the first and second shrinkable control film, an acrylic polymer film having an expansion coefficient at a temperature of 120° C. of 10% and a thickness of 1 μm was used as the first and second expansible control films (61, 62). The first and second expansible control films were produced in the same manner as the production method of the first and second shrinkable control films of Example 1 except that 5 wt % of the acrylic monomer was used instead of the epoxy monomer.

Example 5

A liquid crystal film cell having the structure of FIG. 5 was manufactured in the same manner as in Example 4, except that in Example 4, the second expansible control film was excluded and the first expansible control film (61) was disposed only inside the first base film.

Example 6

A liquid crystal film cell having the structure of FIG. 6 was manufactured in the same manner as in Example 4, except that in Example 4, the first expansible control film was excluded and the second expansible control film (62) was disposed only inside the second base film.

Comparative Example 1

A liquid crystal film cell having the structure of FIG. 7 was manufactured in the same manner as in Example 1, except that in Example 1, the first and second expansion control layers were not laminated.

<High-Temperature Durability and Gravity Defect Evaluation>

High-temperature durability and gravity defects were evaluated in such a manner that the liquid crystal film cells of Examples 1 and 4 and Comparative Example 1 were kept up in a constant temperature and humidity oven (VT3000 from votsch) at a temperature of 120° C. FIG. 8 is a schematic diagram showing deformation of the liquid crystal film cell of Example 1 at high temperature, and FIG. 9 is a schematic diagram showing deformation of the liquid crystal film cell of Comparative Example 1 at high temperature. The high-temperature durability and gravity defects were evaluated by measuring the transmittance with respect to the height of the liquid crystal film cell, and the results were described in Table 1 below.

TABLE 1

| Height (mm) | Transmittance (%) | | | |
|---|---|---|---|---|
| | 25° C. | 120° C. (Comparative Example 1) | 120° C. (Example 1) | 120° C. (Example 4) |
| 0 | 0.5 | 0.1 | 0.5 | 0.5 |
| 200 | 0.5 | 0.7 | 0.5 | 0.5 |
| 400 | 0.5 | 2 | 0.5 | 0.5 |
| 600 | 0.5 | 5 | 0.5 | 0.5 |
| 800 | 0.5 | 10 | 0.5 | 0.5 |
| 1000 | 0.5 | 20 | 0.5 | 0.5 |

Table 1 is the results of measuring gravity defects after leaving the liquid crystal film cell having a width of 500 mm and a height of 1000 mm in a state kept up in a constant-temperature and humidity oven at a temperature of 120° C. for 2 hours. The gravity defects refers to a phenomenon in which liquid crystals and anisotropic dyes flow downward by gravity with a cell gap change due to film expansion at a high temperature. It is possible to prevent occurrence of gravity defects by using an expansible control film (inside of the base film) or a shrinkable control film (outside of the base film), where the cell gap change can be measured for each position through measurement of transmittance shown in Table 1 above. For example, it means that when the transmittance is 0.5%, the thickness of the layer comprising the liquid crystal and anisotropic dye is 10 μm; when the transmittance is 20%, the thickness of the layer comprising the liquid crystal and anisotropic dye is 7 μm; and when the transmittance is 0.1%, the thickness of the layer comprising the liquid crystal and anisotropic dye is 20 μm. In the case of Comparative Example 1 in which there is no expansion control layer, gravity defects occur and the liquid crystal and anisotropic dye contents vary depending on the height, resulting in non-uniformity of transmittance. However, in the case of Example 1 comprising the expansion control layer, the transmittance according to the height is constant because the content of the liquid crystal and the anisotropic dye according to the height is maintained.

EXPLANATION OF REFERENCE NUMERALS

10: liquid crystal layer 21, 22: first and second alignment films 31, 32: first and second electrode layers 41, 42: first and second base films 51, 52: first and second shrinkable control films 61, 62: first and second expansible control films 70: sealant 80: spacer 101: load 102: LVDT (linear variable differential transformer) 103: signal related to position 104: thermocouple 105: probe 106: sample 107: furnace

The invention claimed is:

1. A liquid crystal film cell, comprising:
a first base film;
a first electrode;
a liquid crystal layer capable of switching between a horizontal orientation state and a vertical orientation state upon application of an external voltage;
a second electrode;
a second base film; and
an expansion control layer,
wherein the first base film, the first electrode, the liquid crystal layer, second electrode, and the second base film are arranged sequentially,
wherein the first and second electrodes deliver the external voltage to the liquid crystal layer,
wherein the first base film having an outer surface and an inner surface, the inner surface being arranged between the first base film and the first electrode,
wherein the expansion control layer directly contacts the outer or inner surface of the first base film, the expansion control layer being disposed between the first base film and the first electrode when disposed on the inner surface, the expansion control layer having an expansion coefficient at a temperature of 25° C. to 120° C. different from that of the first base film which the expansion control layer directly contacts, and
wherein when the expansion control layer directly contacts the outer surface of the first base film, the first electrode directly contacts the inner surface of the first base film, and when the expansion control layer directly contacts the inner surface of the first base film, the first electrode directly contacts the expansion control layer.

2. The liquid crystal film cell according to claim 1, wherein the difference in the expansion coefficient at a temperature of 25° C. to 120° C. between the first base film and the expansion control layer is −30% to 30%.

3. The liquid crystal film cell according to claim 1, wherein the ratio of the expansion coefficient at a temperature of 25° C. to 120° C. of the first base film to the expansion control layer is 1:0.7 to 1:1.3.

4. The liquid crystal film cell according to claim 1, wherein the expansion control layer directly contacts the outer surface of the first base film and is a shrinkable control film having an expansion coefficient at a temperature of 25° C. to 120° C. smaller than that of the first base film, wherein the first base film is sequentially arranged between the liquid crystal layer and the expansion control layer.

5. The liquid crystal film cell according to claim 4, wherein the absolute value of the difference in the expansion coefficient at a temperature of 25° C. to 120° C. of the shrinkable control film to the first base film is in a range of 0.1% to 30%.

6. The liquid crystal film cell according to claim 1, wherein the expansion control layer directly contacts the inner surface of the first base film and is an expansible control film having an expansion coefficient at a temperature of 25° C. to 120° C. higher than that of the first base film, wherein the expansion control layer is sequentially arranged between the first base film, and the liquid crystal layer.

7. The liquid crystal film cell according to claim 6, wherein the absolute value of the difference in the expansion coefficient at a temperature of 25° C. to 120° C. of the expansible control film to the first base film is 0.1% to 30%.

8. The liquid crystal film cell according to claim 1, further comprising:
a second expansion control layer that directly contacts one surface of the second base film.

9. The liquid crystal film cell according to claim 1, wherein at least one of the first base film or the second base film comprises a plastic film.

10. The liquid crystal film cell according to claim 1, wherein the expansion control layer comprises an epoxy polymer or an acrylic polymer.

11. The liquid crystal film cell according to claim 1, wherein the liquid crystal layer comprises a liquid crystal compound and an anisotropic dye.

12. The liquid crystal film cell according to claim 1, wherein the liquid crystal layer comprises a spacer for maintaining a cell gap.

13. The liquid crystal film cell according to claim 1, wherein the liquid crystal layer comprises a sealant on its sides.

14. The liquid crystal film cell according to claim 1, further comprising:
a first alignment film disposed between the first base film and the liquid crystal layer; and
a second alignment film disposed between the second base film and the liquid crystal layer.

15. A window comprising the liquid crystal film cell of claim 1.

16. A sunroof comprising the liquid crystal film cell of claim 1.

* * * * *